(12) United States Patent
Schumacher

(10) Patent No.: US 9,462,125 B1
(45) Date of Patent: *Oct. 4, 2016

(54) IDENTIFICATION OF PUBLIC SAFETY ANSWERING PLATFORM NEXT GENERATION 911 MEDIA SUPPORT

(71) Applicant: Sprint Communications Company L.P., Overland Park, KS (US)

(72) Inventor: Gregory Schumacher, Holliston, MA (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 14/945,062

(22) Filed: Nov. 18, 2015

Related U.S. Application Data

(63) Continuation of application No. 14/175,524, filed on Feb. 7, 2014, now Pat. No. 9,241,076, which is a continuation of application No. 13/589,780, filed on Aug. 20, 2012, now Pat. No. 8,699,672.

(51) Int. Cl.
| | |
|---|---|
| *H04M 11/04* | (2006.01) |
| *H04M 3/51* | (2006.01) |
| *H04W 4/22* | (2009.01) |
| *H04M 3/22* | (2006.01) |
| *H04M 3/42* | (2006.01) |
| *H04L 29/06* | (2006.01) |

(52) U.S. Cl.
CPC ........ *H04M 3/5116* (2013.01); *H04L 65/1006* (2013.01); *H04L 65/1073* (2013.01); *H04M 3/2254* (2013.01); *H04M 3/42357* (2013.01); *H04M 3/5183* (2013.01); *H04W 4/22* (2013.01)

(58) Field of Classification Search
CPC ............. H04M 1/0285; H04M 1/271; H04M 1/6041; H04M 3/5116; H04M 11/04; H04M 2242/04; H04M 2242/30
USPC ........ 379/22.01, 26.01, 45; 455/401.1, 404.2
See application file for complete search history.

(56) References Cited

U.S. PATENT DOCUMENTS

| | | | |
|---|---|---|---|
| 8,638,907 B1 | 1/2014 | Schumacher | |
| 8,699,672 B1 * | 4/2014 | Schumacher | H04W 4/22 379/40 |
| 9,172,818 B1 * | 10/2015 | Schumacher | H04L 65/1006 |
| 9,241,076 B1 * | 1/2016 | Schumacher | H04W 4/22 |
| 2012/0302217 A1 | 11/2012 | Sennett et al. | |

OTHER PUBLICATIONS

National Emergency Number Association (NENA) Technical Committee Chairs, NENA Detailed Functional and Interface Standards for the NENA i3 Solution (TSD), NENA 08-003 v1, Jun. 14, 2011.

(Continued)

*Primary Examiner* — Quoc D Tran

(57) ABSTRACT

A method, system, and medium are provided for generating a profile for public safety answering platforms. The profile identifies media formats supported by the PSAPs at various cell sector locations maintained by a network provider. A network server selects a cell sector and generates a test emergency services call. The test emergency services call is transmitted to a PSAP. The PSAP generates a response that indicates whether the PSAP supports a media format identified in the test emergency services call. The PSAP transmits the response to the network server for storage in the profile.

19 Claims, 5 Drawing Sheets

(56) References Cited

OTHER PUBLICATIONS

Intrado Inc., "Articles", Available at: http://www.intrado.com/news/articles/, 2012.
Verint Systems Inc., "Product Portfolio—Impact 360 for Public Safety Powered by Audiolog: Multimedia recording, speach analytics, eLearning and coaching, performance scorecards, forecasting and scheduling, and citizen surveys", Available at: http:verint.com/public_safety/overview.cfm?article_level11_category_id=422, 2012.
Serge Panossian and Deep Medhi, "Towards Providing Enhanced 911 Emergency Service in IP Telephony", University of Missouri—Kansas City, Kansas City, MO, USA, Nov. 1998.
verticalnews.com, "Verizon and Intrado Join Forces to Deploy Next-Generation 911 Services Nationwide", Journal of Technology & Science, Mar. 6, 2011.
Todd Poremba, "Recommendations for Implementing NG9-1-1 Components", TeleCommunication Systems (TCS)—Enabling Convergent Technologies, Jun. 4, 2010.
Ashok Bindra, "Vermont Launches First Statewide Text-to-911 Trial for Emergency Help", Available at: http://www.tmcnet.com/channels/e911-hosted-solutions/articles/289353, May 8, 2012.
Monica Gleberman, "Virginia's Franklin County Upgrading to Next-Generation 911 System", Available at: http://www.tmcnet.com/channels/e911-hosted-solutions/articles/246832, Dec. 19, 2012.
Intrado Inc., "Public Safety—NG 9-1-1", Available at: http://www.intrado.com/solutions/PSAP, 2012.
First Action Interview Preinterview Communication dated Jun. 11, 2013 in U.S. Appl. No. 13/589,780, 4 pages.
Notice of Allowance dated Nov. 25, 2013 in U.S. Appl. No. 13/589,780, 10 pages.
First Action Interview Preinterview Communication dated Jun. 13, 2013 in U.S. Appl. No. 13/589,798, 4 pages.
Notice of Allowance dated Sep. 17, 2013 in U.S. Appl. No. 13/589,798, 8 pages.
First Action Interview Preinterview Communication dated Jun. 18, 2014 in U.S. Appl. No. 14/090,156, 5 pages.
Notice of Allowance dated Sep. 17, 2014 in U.S. Appl. No. 14/090,156, 7 pages.
First Action Interview Preinterview Communication dated Apr. 3, 2015 in U.S. Appl. No. 14/559,622, 5 pages.
Notice of Allowance dated Jun. 24, 2015 in U.S. Appl. No. 14/559,622, 7 pages.
First Action Interview Preinterview Communication dated May 19, 2015 in U.S. Appl. No. 14/175,524, 5 pages.
Notice of Allowance dated Sep. 2, 2015 in U.S. Appl. No. 14/175,524, 7 pages.

* cited by examiner

IDENTIFICATION OF PUBLIC SAFETY ANSWERING PLATFORM NEXT GENERATION 911 MEDIA SUPPORT

PRIORITY

This application is a continuation of U.S. application Ser. No. 14/175,524, filed Feb. 7, 2014, entitled "IDENTIFICATION OF PUBLIC SAFETY ANSWERING PLATFORM NEXT GENERATION 911 MEDIA SUPPORT," which is a continuation of U.S. Pat. No. 8,699,672; U.S. application. Ser. No. 13/589,780, issued Apr. 15, 2014, filed Aug. 20, 2012, entitled "IDENTIFICATION OF PUBLIC SAFETY ANSWERING PLATFORM NEXT GENERATION 911 MEDIA SUPPORT," which are each hereby incorporated by reference in their entirety.

SUMMARY

A high-level overview of various embodiments of the invention is provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to generate a profile for a public safety answering platform (PSAP), where the profile identifies media formats supported by the PSAP.

The wireless network, in some embodiments, includes a network server that generates test emergency services calls. The wireless network may include multiple cell sectors. Each cell sector may be covered by one or more PSAPs. The network server generates test emergency services calls for each sector to identify the PSAPs covering each sector and to identify the media support provided by the PSAPs. The network server may randomly select a cell sector maintained by the wireless network provider. In turn, the network server generates a test emergency services call and transmits the test emergency services call to a PSAP. The test call may identify one or more media formats supported by the wireless network. The network server receives a response from the PSAP. The response indicates whether the PSAP supports a media format identified in the test call. The profile for the PSAP is created to store an identifier for the PSAP and the corresponding media formats supported by the PSAP. The profile may be stored in a database connected to the network server.

In other words, the PSAP provides a response having the supported media format. In one embodiment, the PSAP obtains a test-emergency-services call. The PSAP may extract media formats requested in the test emergency services call. The current media format capabilities are identified by the PSAP. If any of the current capabilities match the extracted media formats, the PSAP generates a response that includes the matching capabilities. If a match is not found, the response indicates that the requested media formats are not supported by the PSAP. The PSAP transmits the response to the network server for storage in the profile.

BRIEF DESCRIPTION OF THE SEVERAL VIEWS OF THE DRAWINGS

Illustrative embodiments of the invention are described in detail below with reference to the attached drawing figures, and wherein.

DETAILED DESCRIPTION

Figure 1:
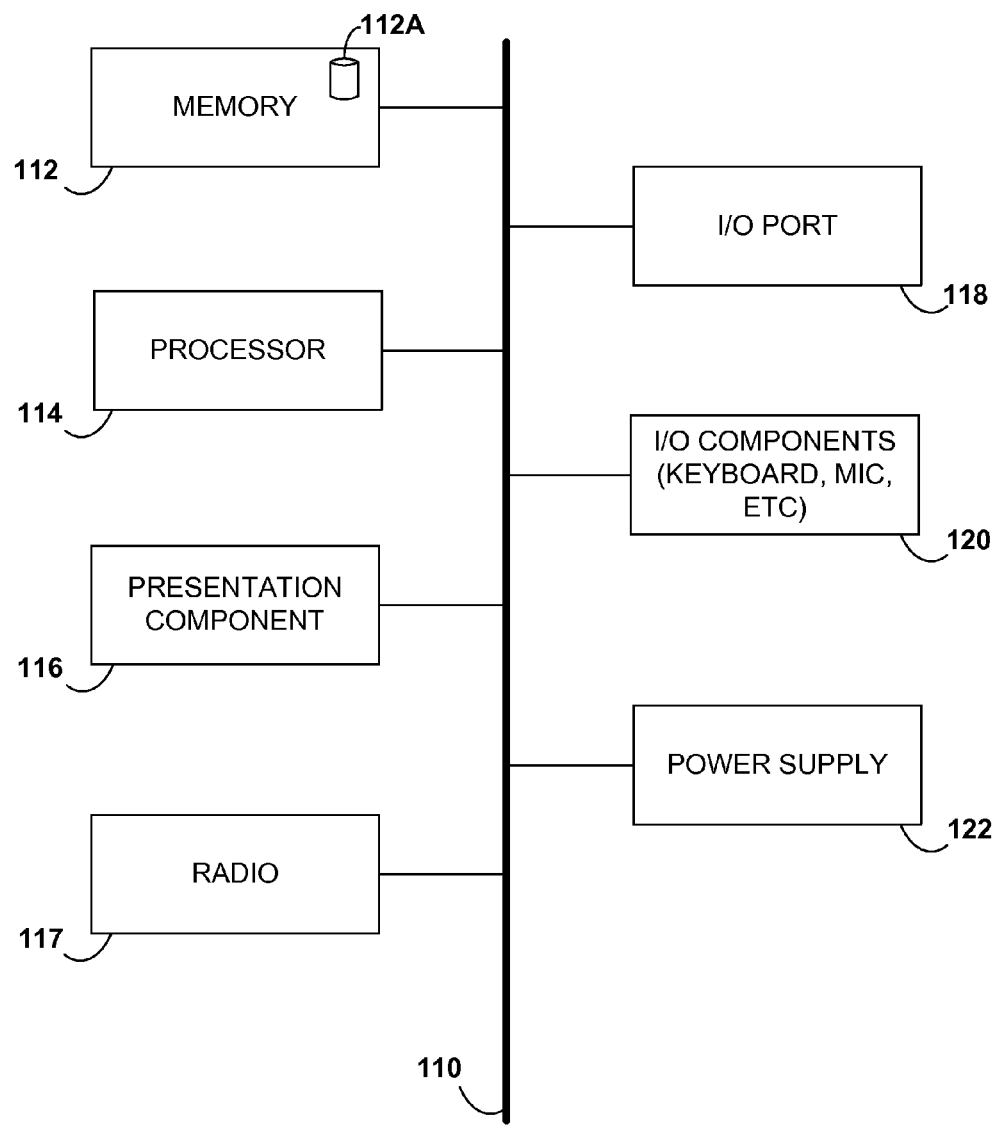
FIG. 1 depicts a block diagram of an exemplary network device in accordance with embodiments of the invention.

The subject matter of the patent is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Embodiments of the invention are directed to identifying media format support at PSAPs that cover cell sectors maintained by a wireless network provider. A network server is configured to build PSAP profiles based on the response to a test emergency services call. The profile includes an indication of the services and media format that are supported by the PSAP. For instance, the networks server, in at least one embodiment, periodically transmits test emergency services calls to the loopback interface of the PSAP to query the capability of the PSAP. The network server receives the responses and stores the capability information in a database.

Accordingly, embodiments of this invention provide a means to automatically determine the media handling capabilities of each of the PSAPs. The response would provide an indication of whether the PSAP is ready for next generation 911 services. In other words, when a wireless device transmits a next generation 911 emergency service call having a supported media format, the PSAP in the cell sector of the wireless device should respond without rejecting the next generation 911 emergency service call as unsupported. If an unsupported media format of the next generation 911 emergency service call is received by the PSAP, the media format may be converted if possible or the next generation 911 emergency service call may be rejected.

A base station or server associated with wireless devices may periodically generate test emergency services calls, in one embodiment. The server processes the PSAP responses to the test emergency services calls. The server stores the capabilities of each PSAP that responds to the test emergency services calls. The capabilities indicate the media formats that are supported by the PSAPs.

For instance, the network server may identify each of the media formats that are currently supported by the wireless network or the wireless devices connected to the wireless network. The media formats include, among others, voice, text, and video. In turn, the network server selects a cell sector out of all the network cell sectors and stores the cell sector identification in a database. The cell sectors may be selected randomly by the network server. In certain embodiments, the geographical location, e.g., latitude and longitude, of the selected cell sectors is also recorded in the database. The network server chooses one or more media formats to include in a test emergency service call. The media formats may be combined in the test emergency service call based on the network server selections. The media format selections that form the combinations may be random. In one embodiment, each cell sector is tested for all of the media formats and for each combination of media formats. In one embodiment, the test emergency services calls may be next generation 9-1-1 calls. The test emergency services calls may be formatted as SIP invites. These SIP invites may contain the cell sector location and the selected media format or combination of media formats. The test emergency services calls are routed to the PSAP that covers the location identified by the cell sector. Responses to the test emergency services calls are generated by the PSAP and returned to the network server. The response may include an identifier for the PSAP that received the test emergency services calls and indications of whether the media formats requested in the test emergency services calls are supported by the PSAP. In some embodiments, the response is an OK response. The OK response indicates that the PSAP supports the media format included in the test emergency services calls. In other embodiments, the response is an error message that indicates that the PSAP does not support the media format included in the test emergency services calls. The profile is updated with the cell sector, PSAP identifier information, and an indication of the media formats that are supported and media formats that are not supported by the identified PSAP. If the test-emergency-services call was processed by the PSAP and an OK response is generated, then the network server knows the PSAP supports the particular media format. If the test-emergency-services calls are processed by the PSAP and an error response is generated, such as "415 Unsupported Media Type," then the network server knows that the PSAP does not support the particular media format.

Throughout this patent, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of these acronyms:

BTS Base Transceiver Station
CDMA Code Division Multiple Access
CD-ROM Compact Disc, Read Only Memory
DVD Digital Versatile Disc
EEPROM Electrically Erasable Programmable Memory
GPRS General Packet Radio Service
GPS Global Positioning System
GSM Global System for Mobile communications (Groupe Spécial Mobile)
IP Internet Protocol
IPv4 Internet Protocol Version Four
IPv6 Internet Protocol Version Six
LED Light Emitting Diode
LTE Long Term Evolution
NFC Near-Field-Communication
PSAP Public Safety Answering Platform
PTT Push-To-Talk
RAM Random Access Memory
ROM Read Only Memory
RNC Radio Network Controller
SDP Session Description Protocol
SIP Session Initiation Protocol
SMS Short Message Service
TDMA Time Division Multiple Access
UMTS Universal Mobile Telecommunications System
USB Universal Serial Bus
Wi-Fi Wireless Fidelity
WiMAX Worldwide Interoperability for Microwave Access Embodiments of the invention can take the form of a method, server, network device, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include communication media and computer storage media implemented in any method or technology that stores information. Examples of stored information include computer-useable instructions, data structures, program components, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

In one embodiment, the network server is configured with several input and output components. The network server may include applications for communicating with different networks. The applications may include an emergency service application. The emergency services application allows wireless devices to communicate with emergency service centers. In one embodiment, the applications include a test emergency services application, which allows the network server to test various media formats supported by the wireless network at multiple PSAPs. The network server may utilize the input and output component of the network server to implement operations requested by the applications.

FIG. 1 depicts a block diagram of an exemplary network server in accordance with embodiments of the invention. Turning now to FIG. 1, a block diagram of an illustrative network server is provided and referenced generally by numeral 100. Although some components are shown in the singular, they may be plural. For example, network server 100 might include multiple processors or multiple radios, etc. A network server 100 may be one of many devices, including, but not limited to, a switch, a router, a mobility agent, or a bridge. As illustratively shown, network server 100 includes a bus 110 that directly or indirectly couples various components including memory 112, a processor 114, a presentation component 116, a radio 117, input/output ports 118, input/output components 120, and a power supply 122.

We have previously described various memory components that memory 112 might take the form of. Memory component 112 can include any type of medium that is capable of storing information (e.g., a database 112A). The database 112A may be configured to store network access credentials, including a network identifier, password, or key associated with the network server 100; location information based on GPS; and any information that the network server 100 transmits to the wireless network. The database 112A may also store applications like emergency services call applications and test emergency services call applications associated with the network server 100. The emergency services may include fire, police, or medical services.

Processor 114 might actually be multiple processors that receive instructions associated with the applications and process the instructions accordingly. Presentation component 116 includes the likes of a display and a speaker, as well as other components that can present information (such as a lamp (LED), or even lighted keyboards) associated with the outputs of applications or other components of the network server 100.

The network server 100 may store cell sector information and may generate profiles based on responses received from PSAPs within the cell sectors. The PSAP responses are generated in reply to test emergency service calls. The response confirms whether media formats supported by the wireless network are supported by the PSAPs.

The communication interface of the network server 100 may be a radio 117 that facilitates communication with a wireless telecommunications network. Illustrative wireless telecommunications technologies include CDMA, GPRS, TDMA, GSM, WiMAX, LTE, UMTS, and the like. In some embodiments, radio 117 might also facilitate other types of wireless communications including Wi-Fi communications, Bluetooth™, Zigbee, or other near-field communication. In other embodiments, the communication interface of the network server 100 may be a wired line like Ethernet.

Input/output port 118 of network server 100 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into network server 100. Power supply 122 includes items such as batteries, fuel cells, or any other component that can act as a power source to power network device 100.

Accordingly, a network server 100 generates test emergency services calls and receives responses that indicate whether PSAPs support the media format. The network server 100 processes the responses to generate a profile. It will be understood and appreciated by those of ordinary skill in the art that the network server 100 shown in FIG. 1 is merely an example of one suitable network server 100 and is not intended to suggest any limitation as to the scope of use or functionality of the embodiments of the invention. Neither should the network server 100 be interpreted as having any dependency or requirement related to any single component or combination of components illustrated therein. The single unit depictions are meant for clarity, not to limit the scope of embodiments in any form.

In some embodiments, a network server on the wireless network generates test emergency services calls. The test emergency services calls are routed to one or more PSAPs based on the cell sectors identified in the test emergency services calls. The test emergency services calls indicates one or more media formats that are supported by the wireless network. The PSAP responses are processed and saved to the database in profiles that specify the media formats that are supported or unsupported by the responding PSAPs.

Figure 2:
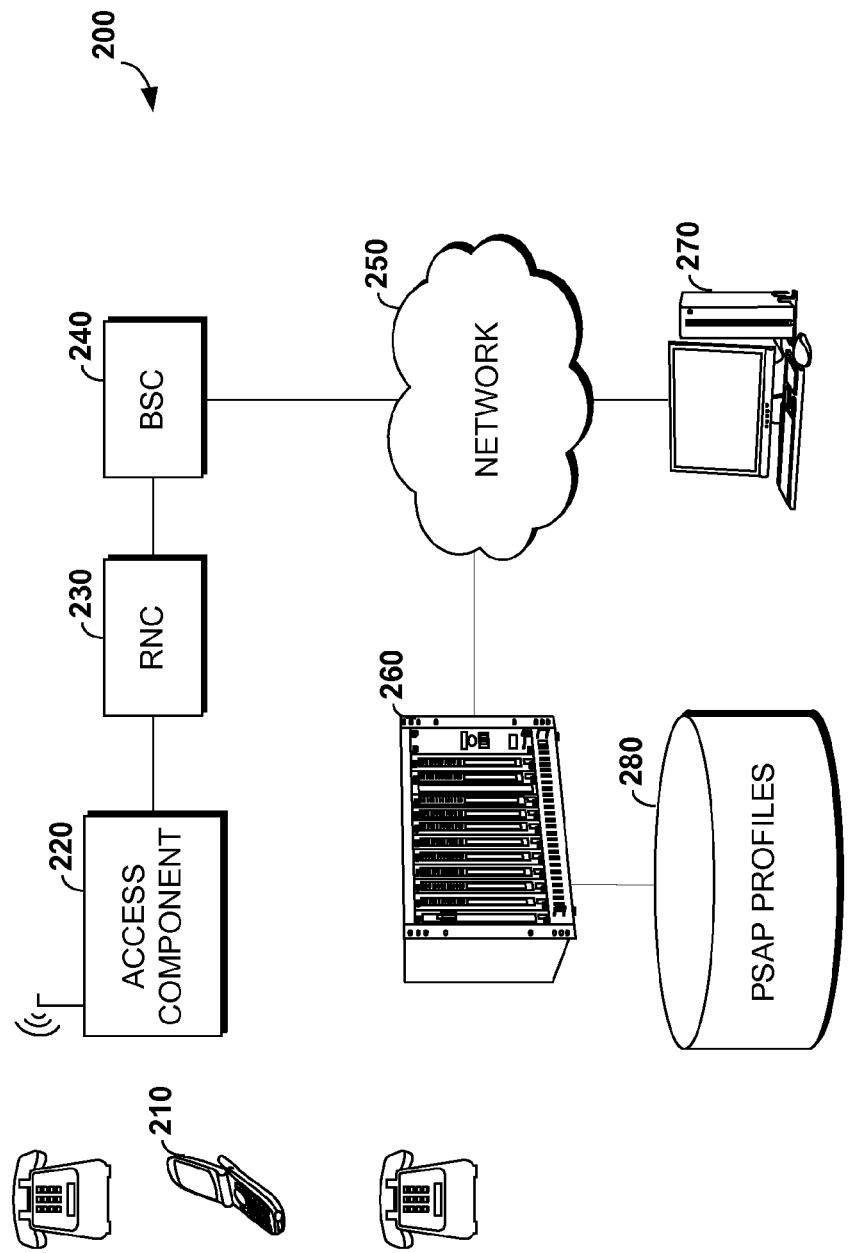
FIG. 2 depicts a network diagram of an exemplary communication system in accordance with embodiments of the invention.

FIG. 2 depicts a network diagram of an exemplary communication system in accordance with embodiments of the invention. Turning now to FIG. 2, an illustrative computing system 200 is provided and referenced generally by the numeral 200, which depicts an illustrative operating environment for determining whether media formats supported by the communication devices 210 are also supported by the PSAPs 270. The computing system 200 may include communication devices 210, access components 220, RNC 230, BSC 240, network 250, network server 260, PSAP 270, and profile database 280.

Communication devices 210 may be used for voice, data, or a combination of voice and data communication. The communication devices 210 may connect to network 250 to complete communication requests. The communication requests may include requests for emergency services. Communication devices 210 may communicate among themselves over a near-field channel in certain embodiments. Communication devices 210 may connect to BSC 240 or a third party via communication link. The BSC 240 or third party may facilitate communication to and among the communication devices 210.

The access component 220 may be a wireless router. Generally, the access component 220 provides access to what some skilled artisans refer to as a wireless communications network 250. The access component 220 may be one or more of a base transceiver station (BTS) tower, a Wi-Fi router, and any other device that facilitates communication between communication device 210 and network 250. In one embodiment, the access component 220 includes both a Wi-Fi router and a BTS tower. In another embodiment, access component 220 is a BTS tower.

A radio network controller (RNC) 230 performs various functions, such as managing radio channels, power control, load control, admission control, packet scheduling, handover control, macrodiversity, security functions, and mobility management. A base station controller (BSC) 240 and network server 260 are also shown in FIG. 2. The BSC 240 acts as the intelligence behind base transceiver stations (BTS) (not shown), and handles allocation of radio channels, receives statistics from the communication devices 210, generates emergency services calls when commanded, and controls handovers from one BTS to another BTS.

The network 250 connects the BSC 240 to the network server 260 and PSAP 270. The network 250 may be an IP network operating one or both of IPv4 and IPv6. The network 250 provides communication links that may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., wireless hotspot) that provides access to a wireless communications network, such as a WLAN connection using 802.11 protocol. A long-range connection may include a connection using one or more of CDMA, GPRS, GSM, TDMA, and 802.16. The network 250 routes the test emergency services calls generated by the network server 260 to appropriate PSAPs 270. The PSAP responses are transmitted to the network server 260 over the network 250.

The network server 260 may be a switch that is configured to generate the test emergency services calls. The test emergency services calls are transmitted to the PSAP. The network server 260 probes the PSAPs 270 with the test emergency services calls. From the responses generated by the PSAPs 270, the network server 260 may determine which of the next generation 9-1-1 capabilities are supported. These test emergency services calls are generated automatically and reduce the manual effort required to test the PSAP 270 and eliminate costs and errors associated with manual testing. The network server 260 extracts the PSAP media format support information and identifiers from the responses and creates a profile for storage in the database 280.

The PSAP 270 is a platform that provides safety for a particular region. Over 6,000 PSAPs 270 may operate with the coverage area of the wireless network 250. The PSAPs 270 may have a disparity in technology deployment, advancement and upgrades, which increases the complexity of determining which PSAPs 270 support media formats available on the wireless network. To identify the capabilities of each PSAP 270, the network server sends test emergency service calls to the PSAP 270. The test emergency services calls, in some embodiments, are sent to the loopback interface of the PSAP 270. In response to the test emergency services calls, the PSAP 270 merely responds the same way it would for a real next generation 9-1-1 call. The results of the test emergency services calls are received by the network server 260, which builds a profile of the current PSAP media capabilities.

The profile database 280 stores the media capabilities for each PSAP 270 that responded to test emergency service calls. In some embodiments, multiple PSAPs 270 may respond to an emergency service call that has a combination of media types. The database 280 stores identifiers for the PSAPs 270, media formats supported, and the media formats that are not supported. The database 280 may also store the location associated with the PSAP 270. The location may correspond to the cell sector identified in the test emergency services call. Accordingly, database 280 may store carrier coverage map showing the location of the PSAP 270 and identifying the media format supported by each of illustrated PSAPs 270. The profile stored by the database may include data about a type of emergency service requested, e.g., fire, police, etc.; the PSAP identifier; and the media formats supported and unsupported. In one embodiment, the media formats include phone calls, text messages, PTT, SMS, video chat, two way communication, one way communication, etc.

The illustrated elements of computing system 200 are meant to be exemplary in nature, and the various lower-level details of the elements are not elaborated on so as to not obscure the embodiments of the invention. Clearly, some of the elements may be absent in some embodiments of the invention, and additional elements not shown may also be part of computing system 200. Attempting to show all of the various elements of computing system 200 would obscure certain novel aspects, and we will refrain from such elaboration at least for the sake of brevity.

A network server, in one embodiment, is configured to build a profile for each cell sector and PSAP within the coverage area of the wireless network. The network server selects a cell sector maintained by the wireless network provider. In turn, the network server generates test emergency services call. The test emergency services calls are transmitted to a PSAP. In response to the test emergency services calls, the PSAP provides a response that indicates whether the PSAP supports a media format identified in the test emergency services call. The PSAP responses is used to populate the database.

Figure 3:
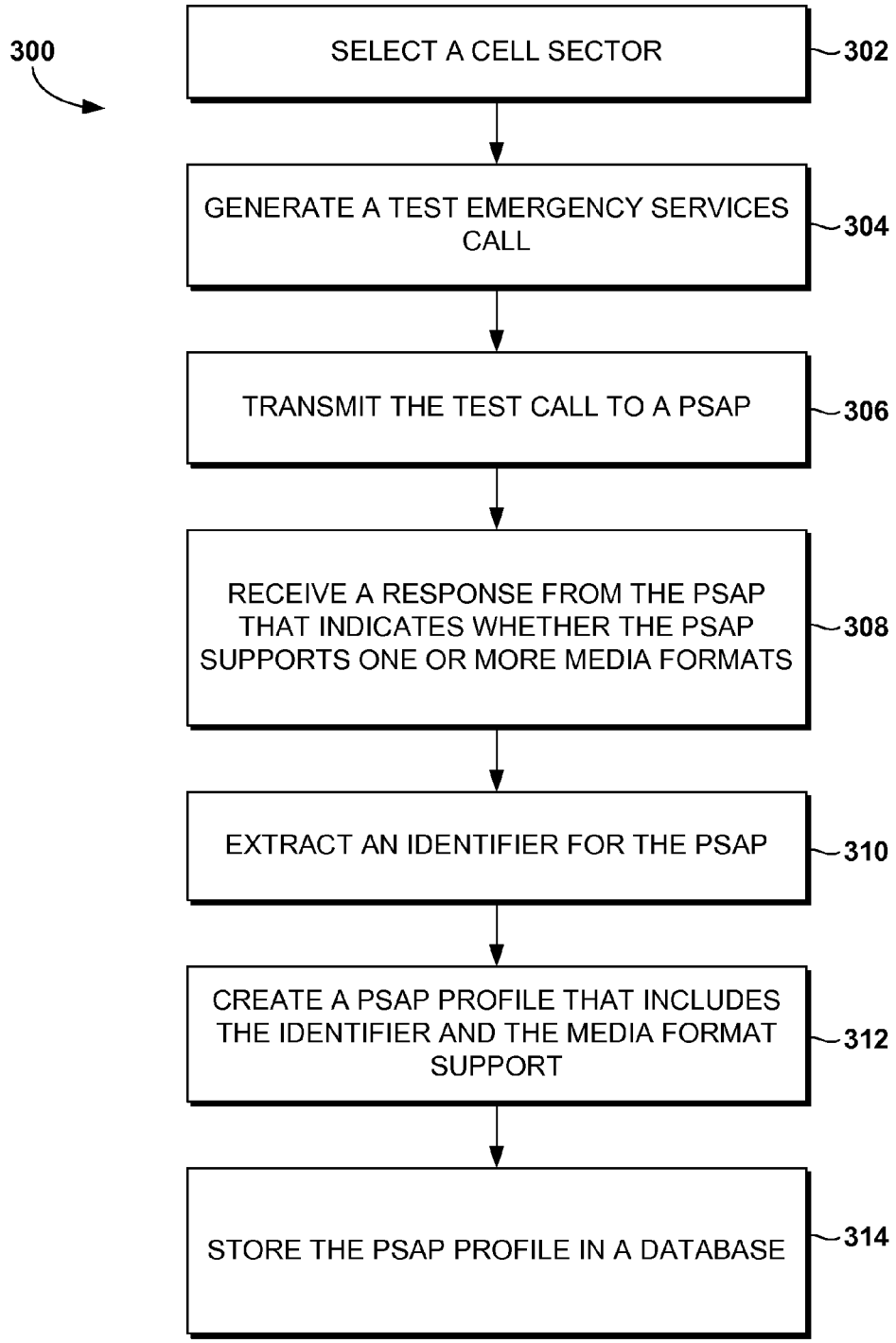
FIG. 3 depicts an exemplary logic diagram for generating a PSAP profile in accordance with embodiments of the invention.

FIG. 3 depicts an exemplary logic diagram for generating a PSAP profile in accordance with embodiments of the invention. Turning now to FIG. 3, in step 302, the network server selects a cell sector maintained by a wireless network provider. The network server, in step 304, generates a test emergency services call. Each cell sector maintained by the network provider is identified in a separate test emergency services call. The test emergency services call is a session description protocol (SDP) message. In other embodiments, the test emergency services call is a session initiation protocol (SIP) message. The test emergency services call identifies at least one media format that is supported by the network provider. The test emergency services call, in other embodiments, may identify at least two media formats that are supported by the network provider, wherein the two media formats may be transmitted at the same time to the PSAP.

The test emergency services call is routed to a PSAP in step 306. The test emergency services call is transmitted, in some embodiments, to a loopback interface of the PSAP. The test emergency services call follows all of the next generation 9-1-1 routing, call handling, and media treatment except that it is never delivered to a PSAP dispatcher (public safety dispatcher that answers 911 calls).

In step 308, the network server receives a response from the PSAP that indicates whether the PSAP supports a media format identified in the test emergency services call. The media formats include push to talk (PTT), text, video, voice, instant messaging, email, two way communication, and one way communication. The network server extracts PSAP identifiers from the response in step 310. A PSAP profile is created, in step 312, by the network server. The PSAP profile includes the PSAP identifiers and media support information for each cell sector covered by the PSAP. The network server, in step 314, stores the PSAP profile for each cell sector in a database. Accordingly, the results of the test emergency services calls are used to build a profile of the current PSAP media capabilities.

In yet another embodiment, the PSAP provides an indication of supported media formats in response to the test emergency services calls. As explained above, the PSAP may obtain a test emergency service call at the loopback interface. The PSAP, in turn, extracts the media formats requested in the test emergency service call. The PSAP may identify current capabilities of the PSAP and determine whether a match exists between the extracted media formats and the current capabilities. When a match is found, the PSAP generates a response that includes the matching capabilities. The PSAP transmits the response to the network server.

Figure 4:
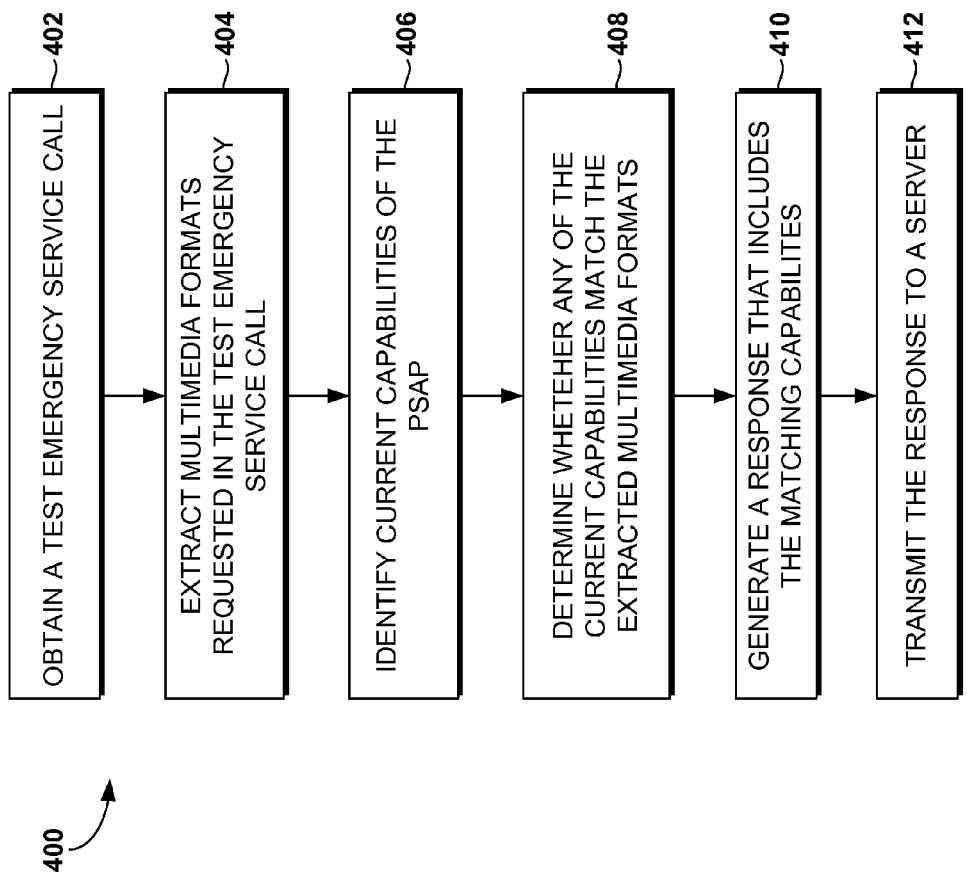
FIG. 4 depicts an exemplary logic diagram for providing a response to a test emergency services call in accordance with embodiments of the invention.

FIG. 4 depicts an exemplary logic diagram for providing a response to a test emergency services call in accordance with embodiments of the invention. Turning now to FIG. 4, in step 402, the PSAP obtains a test emergency service call at the loopback interface. The PSAP extracts the media formats requested from the test emergency services call in step 404. The test emergency services call is a SDP message in some embodiments. The PSAP identifies current capabilities in step 406.

In step 408, the PSAP determines whether any of the current capabilities match the extracted media formats. The PSAP generates, in step 410, a response that includes the matching capabilities. In turn, the PSAP transmits the response to the network server in step 412. The response may be, in at least one embodiment, formatted as a SDP message. The response includes an identifier for the PSAP. Thus, PSAP is configured to respond to the test emergency service call without disrupting real emergency service calls that should be routed to a dispatcher. The PSAP media format's support is determined without emergency services dispatcher input.

In one embodiment, the database is updated with a PSAP profile based on a test emergency services call. The test emergency services call may be a SDP message generated by a network server of the wireless network. The SDP message is routed to the appropriate PSAP based on the cell sector identified in the test emergency services call. The PSAP generates a SDP response that indicates whether the PSAP supports one or more media formats identified in the SDP message. The SDP response is received at the network server, which updates the PSAP profile.

Figure 5:
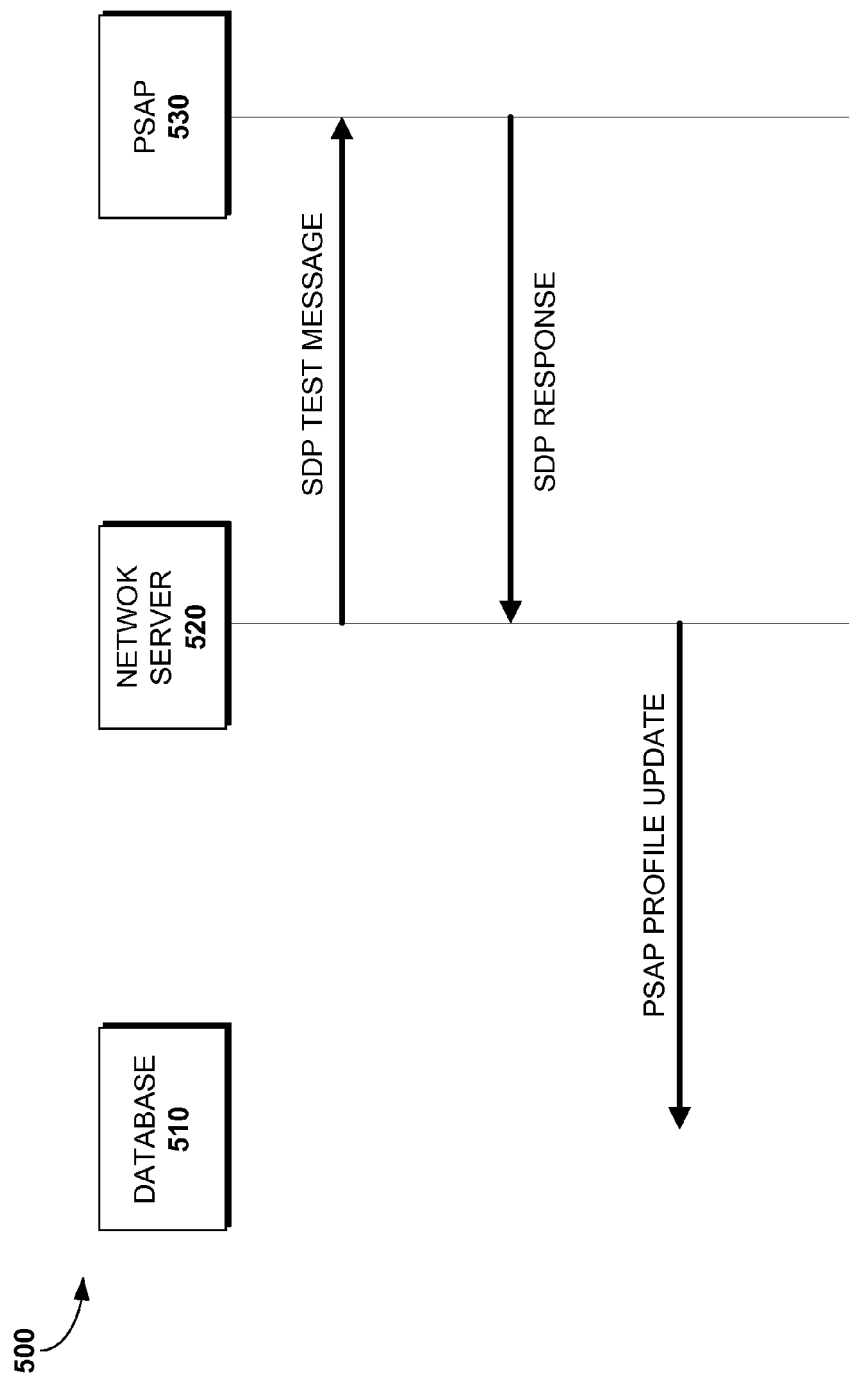
FIG. 5 depicts an exemplary communication flow diagram receiving a response to the test emergency services call in accordance with embodiments of the invention.

FIG. 5 depicts an exemplary communication flow diagram receiving a response to the test emergency services call in accordance with embodiments of the invention. A database 510, network server 520, and PSAP 530 exchange communication messages. The network server 520 generates a SDP message. The SDP message is a test emergency services call that identifies the cell sector and media formats. The SDP message is routed to a PSAP 530 based on the cell sector. The PSAP 530 received the SDP message and provides a SDP response. The SDP response indicates whether the media formats identified in the SDP message are supported by the PSAP 530. The network server 520 receives the SDP response and generates a profile update message that is transmitted to the database. The profile update message may include an identifier of the PSAP 530 and the media formats that are supported or not supported as indicated in the SDP response.

In summary, embodiments of the invention configure network servers to probe PSAPs in coverage areas supported by the wireless network providers. The network servers utilize SDP or SIP messages to probe media support at the PSAP. The SDP or SIP message describes media support by the wireless network and the cell sectors of interest. These messages are routed to the PSAP, which provides an OK response or Error response. These responses are processed by the network server to create and update PSAP profiles for the wireless network.

Real next generation 9-1-1 calls are not used to create or update the PSAP profile because real next generation 9-1-1 calls may burden dispatchers and may not include the necessary diversity of media format usage. Importantly, the distribution of real emergency calls cannot be guaranteed to use or try all the media types that the wireless network supports through all of the cell sectors. To obtain a sample size of any significance would take a very long period of time (possibly decades). The automatic test emergency service calls includes all the media format. And the PSAP provides response to the test emergency service calls in a much shorter period of time.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:

1. One or more non-transitory computer-readable media having computer-executable instructions embodied thereon that, when executed, perform a method to identify media format support, the method comprising:
    obtaining a test emergency service call at one or more Public Safety Answering Platforms (PSAPs), wherein the test emergency service call includes a combination of two different types of media;
    processing the test emergency services call at one or more PSAPs;
    determining whether the one or more PSAPs support the combination of the media format in the test emergency services call;
    if the combination of media formats are supported, updating a profile associated with the one or more PSAPs to indicate that the combinations of different media format included in the test emergency services call may be sent to the identified PSAPs; and
    providing the location of the PSAPs with the media format support data for illustration on a carrier coverage map associated with a communication provider.

2. The media of claim 1, wherein each cell sector maintained by the communication provider is identified in the coverage map.

3. The media of claim 1, wherein the test emergency services call is a session description protocol (SDP) message.

4. The media of claim 1, wherein the test emergency services call is a session initiation protocol (SIP) message.

5. The media of claim 1, wherein the test emergency services call identifies at least one media format that is supported by the communication provider.

6. The media of claim 1, wherein the test emergency services call identifies at least two media formats that are supported by the communication provider, wherein the two media formats may be transmitted at the same time to the PSAPs.

7. The media of claim 1, wherein the media formats include push to talk (PTT), text, video, voice, instant messaging, email, two way communication, and one way communication.

8. The media of claim 1, wherein the test emergency services call is transmitted to a loopback interface of the PSAPs.

9. The media of claim 1, further comprising: extracting PSAP identifiers from a PSAP response; and creating a PSAP profile that includes the identifiers and media support information for each cell sector.

10. The media of claim 9, further comprising: storing the PSAP profile for each cell sector in a database.

11. A method to identify media format support for a Public Safety Answering Platform (PSAP), the method comprising:
    without disrupting real emergency service calls at the PSAPs, processing a test emergency services call;
    obtaining a PSAP response;
    extracting PSAP identifiers from the PSAP response;
    creating a PSAP profile that includes the identifiers and media support information for each cell sector; and
    providing the location of the PSAPs with the media format support data for illustration on a carrier coverage map associated with a communication provider.

12. The method of claim 11, further comprising: storing the PSAP profile for each cell sector in a database.

13. The media of claim 11, wherein a database stores the coverage map having the location of the PSAPs and identifying the media format supported by each of the illustrated PSAPs.

14. One or more non-transitory computer-readable media having computer-executable instructions embodied thereon that, when executed, perform a method to identify media format support, the method comprising:
    obtaining a test emergency service call at one or more Public Safety Answering Platforms (PSAPs), wherein the test emergency service call includes a combination of two different types of media;

determining whether the one or more PSAPs support the combination of the media format in the test emergency services call;

extracting multimedia format requested in the test emergency service call;

identifying current capabilities of the PSAP;

determining whether any of the current capabilities match the extracted multimedia formats; and if the combination of media formats are supported, updating a profile associated with the one or more and PSAPs to indicate that the combinations of different media format included in the test emergency services call may be sent to the identified PSAPs.

15. The media of claim 14, further comprising: providing the location of the PSAPs with the media format support data for illustration on a carrier coverage map associated with a communication provider.

16. The media of claim 15, wherein a database stores the coverage map having the location of the PSAPs and identifying the media format supported by each of the illustrated PSAPs.

17. The media of claim 16, further comprising: storing the PSAP profile for each cell sector in the database.

18. The media of claim 14, wherein the test emergency services call is a session description protocol (SDP) message.

19. The media of claim 14, wherein the test emergency services call is a session initiation protocol (SIP) message.

* * * * *